United States Patent [19]

Wernick

[11] Patent Number: 4,678,555
[45] Date of Patent: Jul. 7, 1987

[54] PREPARATION OF CELLULOSE ACETATE MEMBRANE AND ITS USE FOR POLAR SOLVENT-OIL SEPARATION
[75] Inventor: David L. Wernick, Elizabeth, N.J.
[73] Assignee: Exxon Research and Engineering Company, Florham Park, N.J.
[21] Appl. No.: 754,005
[22] Filed: Jul. 11, 1985

Related U.S. Application Data

[62] Division of Ser. No. 561,287, Dec. 14, 1983, Pat. No. 4,541,972.
[51] Int. Cl.$^4$ .................. C10G 21/28; B01D 13/00
[52] U.S. Cl. ........................ 208/36; 208/33; 208/321; 208/308; 210/500.3
[58] Field of Search .............. 208/33, 308, 31, 321, 208/36; 264/41, 49, 187, 207, 200, 235, 330; 210/500.2; 536/57, 69, 80

[56] References Cited

U.S. PATENT DOCUMENTS

| | | | |
|---|---|---|---|
| 3,140,256 | 7/1964 | Martin et al. | 210/23 |
| 3,412,184 | 11/1968 | Sharples et al. | 264/49 |
| 3,483,282 | 12/1969 | Majikian | 264/41 |
| 3,585,126 | 6/1971 | Cannon et al. | 210/23 |
| 3,620,970 | 11/1971 | King et al. | 210/23 |
| 3,669,954 | 6/1972 | Schaeffler | 260/230 |
| 3,673,084 | 6/1972 | King et al. | 210/23 |
| 3,762,566 | 10/1973 | Del Pico | 210/490 |
| 3,837,900 | 9/1974 | Englert et al. | 117/93.1 |
| 3,864,289 | 2/1975 | Rendall | 260/15 |
| 3,878,276 | 4/1975 | Hoernschemeyer | 264/41 |
| 3,884,801 | 5/1975 | Kesting | 210/23 |
| 4,130,403 | 12/1978 | Cooley et al. | 55/16 |
| 4,145,295 | 3/1979 | Kutowy et al. | 210/500 |
| 4,171,987 | 10/1979 | Horiguchi et al. | 106/122 |
| 4,186,238 | 1/1980 | Holst et al. | 428/326 |
| 4,194,024 | 3/1980 | Holst et al. | 427/180 |
| 4,200,558 | 4/1980 | Holst et al. | 260/17 |
| 4,239,545 | 12/1980 | Uemura et al. | 106/181 |
| 4,305,824 | 12/1981 | Uemura et al. | 210/500.2 |
| 4,368,112 | 1/1983 | Thompson et al. | 208/308 X |
| 4,541,972 | 9/1985 | Wernick | 208/33 |

FOREIGN PATENT DOCUMENTS

| | | |
|---|---|---|
| 0012630 | 12/1979 | European Pat. Off. |
| 2413157 | 10/1974 | Fed. Rep. of Germany |
| 136356 | 10/1975 | Japan |
| 3082670 | 7/1978 | Japan |
| 5003859 | 1/1980 | Japan |
| 5024506 | 2/1980 | Japan |
| 7119809 | 1/1981 | Japan |
| 1272574 | 5/1972 | United Kingdom |
| 1430323 | 3/1974 | United Kingdom |

OTHER PUBLICATIONS

"Asymmetric Membrane Preparation from Nonsolvent Casting Systems" Kinger et al, Desalination 46 (1983) 327–334.
"Stabilization of Cellulosic Desalination Membranes by Crosslinking" Hoernschemeyer, et al, Reverse Osmosis Membrane Research, Lowdale & Podall (Editors) Plenum N.Y. 1972 163–176.
"Far Hydrolyzed Cellulose Acetate" Malm, et al., Industrial & Engineering Chemistry, vol. 49, No. 1, pp. 79–83, Jan. 1957.
"Liquid Mixture Separation by Flat Sheet and Hollow Fiber Membanes" Cabasso & Leon AICHE Meeting, Boston, Sep. 1975.
"The Use of Solubility Parameters for Solvent Selection in Asymmetric Membrane Formation" Klein & Smith, Reverse Osmosis Membrane Research (Lowdale & Podall, eds.) Plenum N.Y. 1972 pp. 61–84.
"Permselectivities of Some Aromatic Compounds in Organic Medium Through Cellulose Acetate Membranes by Reverse Osmosis" Nomura et al., J. App. Poly Science vol. 22, pp. 2609–2620 (1978).

Primary Examiner—Andrew H. Metz
Assistant Examiner—Glenn Caldarola
Attorney, Agent, or Firm—Joseph J. Allocca

[57] ABSTRACT

It has been discovered that cellulose acetate membranes, fabricated using nonaqueous solvent systems, can be used for the separation of polar solvents, especially ketone dewaxing solvents from dewaxed oil. The cellulose acetate membranes so prepared are of a reduced acetyl content and exhibit very good resistance to ketone solvents. The specific fabrication procedure avoids exposing the cellulose acetate to even transient mixtures of ketone and alcohol or ketone and water. Although the cellulose acetate polymer is insoluble in pure water, alcohol, or ketone it is soluble in mixtures of ketone-alcohol and ketone-water.

The resulting membrane is an effective means for separating ketone dewaxing solvent from dewaxed oil.

5 Claims, 3 Drawing Figures

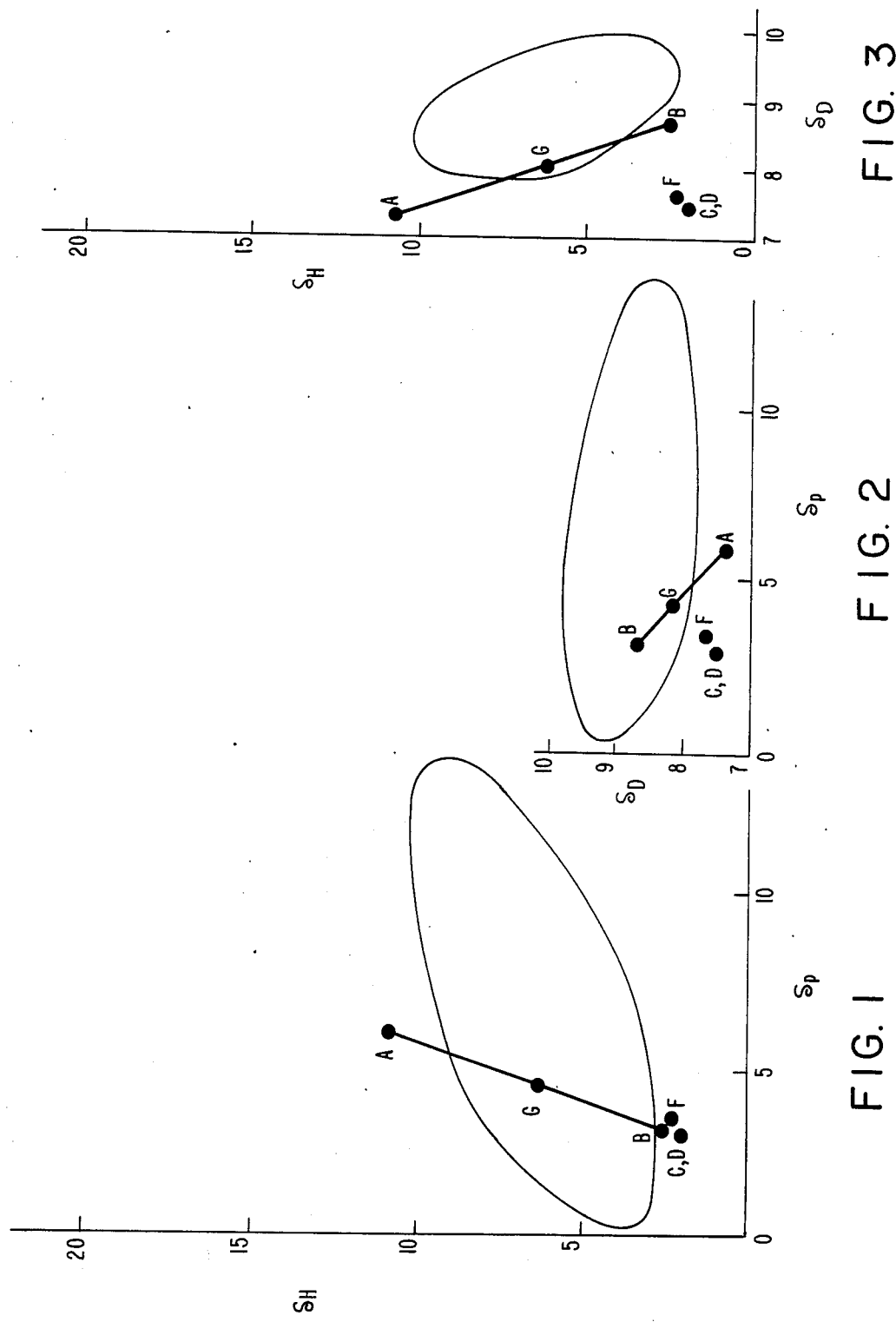

PREPARATION OF CELLULOSE ACETATE MEMBRANE AND ITS USE FOR POLAR SOLVENT-OIL SEPARATION

This is a division of application Ser. No. 561,287, filed Dec. 14, 1983, now U.S. Pat. No. 4,541,972.

DESCRIPTION OF THE INVENTION

Cellulose actate membranes, demonstrating good resistance to ketone solvents and possessing the ability to separate ketone dewaxing solvent from dewaxed oil are described. They are prepared by using a carefully selected nonaqueous solvent process. The cellulose acetate membrane is cast, gelled and annealed in an entirely organic solvent system, preferably selected according to solubility parameter considerations. The solvents used are such that no solvent exchange process is necessary to prepare the cellulose acetate membrane for use in ketone/oil separation procedures. Alternatively, the solvents are selected so that a solvent exchange process that does not weaken the membrane may be employed.

The cellulose acetate membranes of the present invention have 0.6-2.0 acetyl/glucose substitution. Higher ratios result in membranes which dissolve in the ketone/oil feed stream. The preferred acetyl/glucose ratio is on the order of 1.7 to 1.8.

Cellulose acetate membranes having acetyl/glucose substitutions of about 0.6 to 2.0 can also be subjected to crosslinking using bifunctional crosslinking agents. Such crosslinking renders cellulose acetate membranes which are not prepared via the previously recited organic solvent system useable for the separation of ketone solvents from mixed ketone/oil feed streams.

SELECTION OF MEMBRANE FABRICATION SOLVENTS

Membranes are fabricated by treating the cellulose acetate polymer under appropriate conditions, defined below, with a sequence of carefully selected solvents. In order to explain the method by which these solvents are selected, the general asymmetric membrane fabrication procedure will first be outlined. Next, the criteria that must be satisfied by each solvent in the sequence will be specified. Third, the use of a solubility parameter theory to identify particular solvents satisfying these criteria will be described. Finally, examples of suitable solvents will be given.

The cellulose acetate polymer is dissolved in a dual casting solvent system, comprising solvents A and B. A film is cast from this solution, and the solvent is allowed to evaporate from the surface of this film for a controlled time. The entire film is then immersed in a gelation solvent (C). Preferably, the film is then annealed by heating it in solvent D. Solvent D (or C if annealing was not performed) is then exchanged with feed, either directly or by contacting the film with a series of intermediate solvents E1, E2, ..., En.

In this procedure, solvent A should be selected so that it is more volatile than solvent B. Preferably, A should boil at <100° C. B should be a nonsolvent for the polymer, although it preferably should swell the polymer without dissolving it. Solvent A is either a solvent or nonsolvent for the polymer, but the mixture of A and B employed as the casting solvent system must of course dissolve the polymer. The proposed effect of these volatility and solubility relationships may be explained as follows. During the evaporation step following film casting, the more volatile solvent A evaporates from the membrane surface to a greater extent than solvent B. Thus, the film surface becomes enriched in B, which does not dissolve the polymer. The polymer therefore precipitates in a thin skin at the surface of the film, which becomes the selective separating barrier of the membrane.

Gelation solvent C must be miscible with A and B, but C must not dissolve the polymer. Upon immersion in C, A and B diffuse out of the film and C diffuses in. This is proposed to precipitate the polymer in the remainder of the film (below the thin skin formed during the evaporation step) forming a porous structure that is believed to be more permeable and less selective than the skin. Solvent C is preferably chosen so that the polymer is insoluble in all mixtures of B and C. This prevents the skin from redissolving in a mixture of B and C transiently formed during the diffusion process. Nevertheless, some fabrication procedures in which the polymer is soluble in a mixture of B and C (but not in either solvent alone) are acceptable, such as membrane 12 of example 5, which was cast from the solvent sequence A=methanol, B=cyclohexanone, and C=ethanol. Possibly, such systems are acceptable because C diffuses into the membrane so rapidly that compositions of B-C mixtures dissolving the polymer are present only for a very brief period, too short for polymer dissolution. It should be noted that B and C may be the same chemical compound. For the purposes of the specification it is to be understood that the term "non-solvent" includes both solvents in which the polymer is substantially insoluble as well as solvents in which the polymer dissolves so slowly that no significant dissolution occurs during the time period of exposure and solvent mixtures the composition of which changes so rapidly as to go from dissolving to nondissolving before any significant dissolution of the polymer occurs.

Annealing solvent D, if employed, must be miscible with C and must be a nonsolvent for the polymer, and the polymer should not dissolve in any mixture of C and D. This prevents the film from dissolving or being destroyed during the brief period immediately after immersion in D while C diffuses out of the film and D diffuses in. D may be the same chemical compound as B and/or C.

Solvents E1, E2, ... En, if employed, must be nonsolvents for the polymer. E1 must be miscible with D (or C if annealing was not performed), E2 with E1, ..., feed with En. Alternatively, if D (or C) is exchanged directly with feed and E1-En are omitted, then D (or C) must be miscible with feed. Preferably, the polymer should be insoluble in all mixtures of D (or C) with E1, E1, with E2, ..., En with feed, or in all mixtures of D (or C) with feed if exchange is performed directly. The reason for this is once again to prevent polymer dissolution during the brief diffusion process immediately following immersion in each solvent and in feed. If this principle is violated, then the membrane will usually partially dissolve during the exchange process, weakening it and causing it to disintegrate; this is illustrated in example 3 below. Occasionally, however, an exchange process violating this principle is acceptable, as in membrane 12 of example 5. Possibly, such exceptions are acceptable for the same reason as that cited above, i.e., that solvent exchange occurs so rapidly that dissolution in a transient mixture does not have time to occur.

Obviously, many combinations of solvents A, B, C, D and E1–En satisfy the above criteria. Most such combinations satisfying the above criteria will produce selective, high flux membranes, although some combinations are more satisfactory than others, for reasons that are not yet understood. It may therefore be necessary to screen several such combinations in order to select the one that is most suitable. Once a particular solvent system is selected, optimization of concentrations, evaporation times, gelation and annealing temperatures, and other fabrication conditions is left to the practitioner.

Preferable candidate solvent combinations satisfying the above criteria may be identified easily using the three dimensional solubility parameter theory of Hansen. This theory is described and three dimensional solubility parameter values for many common solvents are given in an article by C. Hansen and A. Beerbower (H. F. Mark, et al., ed., "Kirk Othmer Encyclopedia of Chemical Technology," 2nd ed., Supplement, Wiley, N.Y., 1971, pp. 889–910). Solubility parameter values for additional solvents can be determined by methods discussed or referenced in that article or in A. Beerbower and J. R. Dickey, ASLE Transactions, 12, 1 (1969). Typical methods by which the theory can be applied to help select solvents for membrane fabrication are discussed by E. Klein and J. K. Smith (in H. K. Lonsdale and H. E. Podall, ed., "Reverse Osmosis Membrane Research," Plenum, N.Y., 1972, pp. 61–84).

In the three dimensional solubility parameter theory, every solvent is assigned three parameters, which approximately represent the tendency of the solvent molecules to interact with one another or with other molecular species via certain mechanisms. These parameters are $\delta_D$ for dispersion interactions, $\delta_P$ for dipolar interactions, and $\delta_H$ for hydrogen-bond interactions. Each solvent is thus represented by a point in three dimensional space with coordinates $(\delta_D, \delta_P, \delta_H)$. A mixture of two solvents is approximately represented by the volume-weighted average of the constituent parameters, i.e., by $(\phi_1\delta_{D1}+\phi_2\delta_{D2}, \phi_1\delta_{P1}+\phi_2\delta_{P2}, \phi_1\delta_{H1}+\phi_2\delta_{H2})$, where $\phi_i$ is the volume fraction of constituent i. In geometric terms, this means that all mixtures of two solvents lie along the line segment joining the pure solvent points in three dimensional space.

The solubility parameter theory correlates the solubility of many compounds, including polymers such as cellulose acetates. Thus, each compound has a characteristic solubility region in three dimensional space, often approximated as a sphere or an ellipsoid. It is then found that the compound is soluble in almost all solvents whose solubility parameters lie within this region, and is insoluble in almost all solvents lying outside the region. Hence, if the solubility region of a cellulose acetate with a particular degree of acetyl substitution is known, then the solubility of the polymer in pure solvents and in solvent mixtures can be predicted with considerable confidence, Moreover, the mutual miscibility of a pair of solvents can be ensured if the solvents are selected to lie reasonably close to each other in the three dimensional solubility parameter space (typically within about 8 $(cal/cm^3)^{\frac{1}{2}}$, somewhat less if the solvents have high molecular weights).

In our invention, the solubility region of a particular cellulose acetate is experimentally determined by testing its solubility in a number of solvents (usually 10–30 solvents are sufficient). A candidate solvent D (or C, if annealing is not to be performed) is then selected among those solvents lying outside the solubility region. Furthermore, D (or C) is selected so that the line between D (C) and the point representing feed (approximately by the point representing MEK or MIBK) does not pass through or very close (without about 0.5 $(cal/cm^3)^{\frac{1}{2}}$) to the solubility region; this ensures that the polymer is insoluble in all mixtures of D and feed. If points representing D (C) and feed are fairly close together (within about 3 $(cal/cm^3)^{\frac{1}{2}}$), then solvent exchange may usually be carried out directly. If they are farther apart, then the feed may not be able to extract D (C) directly from the membrane, and an intermediate sequence of exchange solvents E1–En may sometimes be necessary. In the latter case, E1–En should be selected to lie outside the polymer solubility region, preferably in order along or near the line joining D (C) and feed.

Solvent C may then be selected outside the solubility region, such that the line joining C and D does not pass through or very close (within 0.5 $(cal/cm^3)^{\frac{1}{2}}$) to the region. Solvent B is also selected outside the solubility region, so that the line between B and C does not pass through the region. Finally, solvent A is selected among the solvents that have a lower boiling point than B (preferably $\leq 100°$ C.) so that the line between A and B passes through the solubility region. The concentrations of A and B in the casting solvent system are selected so that the volume-weighted average point representing the mixture lies within the solubility region.

Most conveniently, solvent D is chosen to be the same as C, and solvent exchange is performed directly, i.e., solvents E1–En are omitted. In that case, a description of the method for selecting solvents A, B, and C is given by Klein and Smith (op. cit.) together with several explanatory illustrations drawn from other types of membranes. A feature of the present invention not discussed by Klein and Smith, however, is that C (the same as D) should be chosen so that the line between C and feed does not pass through or very close to the solubility region.

DESCRIPTION OF THE FIGURES

FIGS. 1, 2 and 3 present graphical representations of the $\delta_H$–$\delta_P$, $\delta_D$–$\delta_P$ and $\delta_H$–$\delta_D$ planes which define the solubility parameter relationships of solvents and nonsolvents for cellulose 1.8 acetate.

For a proper appreciation of these relationships, it is best to construct a three dimensional graph (i.e., a scale model) of the solubility parameter space or to visualize such a graph with a computer-generated stereoview. Usually, however, it is quite adequate to illustrate the solubility parameter relationships as two dimensional projections on the $\delta_H$–$\delta_P$, $\delta_D$–$\delta_P$, and $\delta_H$–$\delta_D$ planes. (See Hansen and Beerbower; Beerbower and Dickey; or Klein and Smith (previously cited above)). The solubility region of cellulose 1.8-acetate (Eastman CA-320S) deduced in this manner is illustrated in FIG. 1, FIG. 2 and FIG. 3.

FIG. 1, FIG. 2 and FIG. 3 illustrate one combination of solvents satisfying the above criteria for cellulose 1.8-acetate (Eastman CA-320S). Solvents A (methanol) and B (cyclohexanone) both lie outside the solubility region, but a 43/57 v/v mixture of A and B (point G) lies within the region and is a suitable casting solvent system for this polymer. Solvents C and D are both methyl isobutyl ketone (MIBK), which lies outside the solubility region in a location such that the B-C line does not intersect the region. The line between C and the average solubility parameter of feed (a 30/70 v/v mixture of methyl ethyl ketone (MEK) and MIBK, point F) also does not intersect the region, and C is sufficiently close to F that solvent exchange can be performed directly. The performance of membranes fabricated using this sequence of solvents is described in Examples 5 and 6, below.

Any quantitative specification of solubility parameter ranges from solvents A,B,C,D and E1–En must necessarily be approximate, since the choice of these solvents is highly interdependent, selection of D influencing selection of C, etc., as described above. In general, however FIG. 1, FIG. 2 and FIG. 3 show that for cellulose 1.8-acetate, any solvent with $\delta_D = 7$–$10$ (FIGS. 2 and 3), $\delta_P = 1$–$10$ (FIGS. 1 and 2), and $\delta_H = 6$–$12$ (FIGS. 1 and 3) is a possible candidate for solvent A. Typical solvents within this range and with boiling points $\leq 100°$ C. are methanol, ethanol, propanol, and isopropanol. Any solvent with $\delta_D = 7$–$10$ (FIGS. 2 and 3), $\delta_P = 0$–$10$ (FIGS. 1 and 2), and $\delta_H < 2.5$ (FIGS. 1 and 3) is a possible candidate for B,C,D, or E1–En. Typical solvents within this range are cyclohexanone, propylene carbonate, MIBK, tetralin, chlorobenzene, and toluene. With cellulose acetates having <1.8 acetyl/glucose substitution, the solubility region shifts to slightly higher values of $\delta_H$ and $\delta_P$, with corresponding shifts in solvent solubility parameter specifications. With cellulose acetates having <1.8 acetyl/glucose substitution, shifts to slightly smaller values of $\delta_H$ and $\delta_P$ are necessary. Cellulose acetates with >2.0 acetyl/glucose, however, are either soluble or mechanically unstable in ketone feed and are unsuitable in this invention.

In preparing the membrane the cellulose acetate polymer possesses an acetyl/glucose ratio of from 0.6 to 2.0, preferably about 1.7 to 1.8. Cellulose acetates of acetyl/glucose ratio of <0.6 are insoluble in all but the most exotic solvents, hence they cannot be readily cast. Cellulose acetates of acetyl/glucose ratio >2.0 are soluble or mechanically unstable in ketones.

The cellulose acetate casting dope comprises from 5–40 wt. % cellulose acetate preferably about 20% cellulose acetate, from 20 to 80 wt. % non-volatile solvent and from 15 to 50 wt. % volatile solvent.

The casting dope is spread as a film on an appropriate casting surface such as glass of Teflon plate or on a moving belt (such as nylon) or is extruded, drawn or spun into tube form etc. and permitted to evaporate for from 0 to 500 seconds depending on how thick a skin layer is desired. Preferred evaporation time is about 30 seconds. Evaporation is conducted at any convenient temperature, e.g., $-20°$ to $+60°$ C. preferably about ambient (i.e. about 22°–25° C.).

The film is then gelled in a gelation bath at from about $-80°$ to $+90°$ C., the upper and lower limits being selected in response to gelation bath freezing temperature and cellulose acetate softening temperature. Gelation is performed for about 10 sec or more.

The gelled film is optionally annealed at 30° C. to 90° C., preferably about 70° C. for about 10 sec. or more, in a solvent bath, as previously described, to prevent membrane dry out and collapse.

The membrane, with or without annealing, is stored in a non-dissolving solvent to prevent membrane dry out. Preferred solvents are MEK, MIBK, or Ketone/oil feed.

The cellulose acetate member described herein produced using the specific solvent types described, selected in accordance with the recited criterion or through crosslinking conventional cellulose acetate membranes as described in detail below, can be used for the recovery of polar dewaxing solvents employed in solvent dewaxing of waxy hydrocarbon oils, preferably waxy petroleum oils, most preferably waxy lube, transformer or other specialty oils, such as white oils. Illustrative, non-limiting examples of waxy stocks are (a) distillate fractions that have a boiling range within the broad range of about 500° F. to about 1300° F., with preferred stocks including the lubricating oil and speciality oil fractions boiling within the range of between about 50° F. and 1200° F., (b) bright stocks and deasphalted resids having an initial boiling point about 800° F., and (c) broad cut feedstocks that are produced by topping or distilling the lightest material off a crude oil leaving a broad cut oil, the major portion of which boils above about 500° F. or 650° F. Additionally, any of these feeds may be hydrocracked prior to distilling, dewaxing or topping. The distillate fractions may come from any source such as the paraffinic crudes obtained from Aramco, Kuwait, the Pan Handle, North Louisiana, etc., naphthenic crudes, such as Tia Juana, Coastal crudes, etc., as well as the relatively heavy feedstocks, such as bright stocks having a boiling range of $1050 +°$ F. and synthetic feedstocks derived from Athabasca Tar Sands, shale, etc.

Waxy hydrocarbon streams are solvent dewaxed employing any one of a number of different processes. Representative, non-limiting examples include solvent dewaxing processes employing indirect heat exchange in a scraped-surface chiller wherein waxy oil and solvent, at approximately the same temperature, are mixed in such a manner so as to effect complete and thorough solution of the oil in the solvent before being cooled or chilled. This solution is then cooled at a uniform, slow rate under conditions which avoid agitation of the solution as the wax precipitates out.

Another well-known method of solvent dewaxing involves conventional, incremental solvent addition. In this method, solvent is added to the oil at several points along a chilling apparatus. However, the waxy oil is first chilled with solvent until some wax crystallization has occurred and the mixture has thickened considerably. A first increment of solvent is introduced at this point in order to maintain fluidity, cooling continues and more wax is precipitated. A second increment of solvent is added to maintain fluidity. This process is repeated until the desired oil-wax filtration temperature is reached, at which point an additional amount of solvent is added in order to reduce the viscosity of the mixture to that desired for the filtration step. In this method the temperature of the incrementally added solvent should also be about the same as that of the wax/oil/solvent mixture at the point of introduction. If the solvent is introduced at a lower temperature, shock chilling of the slurry usually occurs, resulting in the formation of small and/or acicula shaped wax crystals with attendant poor filter rate.

Still another well-known process is the DILL-CHILL ® process wherein waxy oil is introduced into an elongated, staged cooling zone or tower at a temperature above its cloud point and incrementally introducing cold dewaxing solvent into said zone, along a plurality of points or stages therein, while maintaining a high degree of agitation so as to effect substantially instantaneous mixing of the solvent and wax/oil mixture as they progress through said zone and resulting in the precipitation of at least a portion of the wax present in the waxy oil. The basic concept is shown in U.S. Pat. No. 3,773,650 while a modification thereof which employs the aforementioned high agitation direct chilling zone augmented by a subsequent, separate and distinct scraped surface indirect chilling zone is presented in U.S. Pat. No. 3,775,288, the disclosure of both of which are incorporated herein by reference.

®Registered service mark of Exxon Research and Engineering Company

Any solvent useful for dewaxing waxy hydrocarbon oil stocks may be used in the process. Representative examples of such solvents are (a) and aliphatic ketones having from 3 to 6 carbon atoms, such as acetone, methyl ethyl ketone (MEK) and methyl isobutyl ketone (MIBK), and (b) mixtures of the aforesaid ketones with $C_6$-$C_{10}$ aromatics such as benzene, xylene and toluene. In addition, halogenated, low molecular weight hydrocarbons such as the $C_1$-$C_4$ chlorinated hydrocarbons, e.g., dichloromethane, dichloroethane, and mixtures thereof, may be used as solvents either alone or in admixture with any of the aforementioned solvents. Preferred solvents are MEK/MIBK and MEK/toluene.

The ketone/oil feed stream should preferably be free from water since the presence of water will result in the reduction of permeation rate of the membrane. Other cellulose acetate menbranes made by conventional techniques involving water bath gelation can be rendered useful for ketone/oil separation if the membrane is first subjected to crosslinking. While cellulose actate having more than 2.0, but less than 2.5 acetyl/glucose ratio can be so crosslinked, cellulose acetates containing <2.0 acetyl/glucose are preferred due to their higher hydroxyl content which promotes more extensive crosslinking. Most preferably, cellulose acetate having 1.7-1.8 acetyl/glucose ratio are used. Water bath gelled cellulose acetate membranes must be flushed to render them useful for ketone/oil separation, i.e., the water must be removed from the membrane. This is accomplished by flushing the membrane with alcohol and/or ketone. While cellulose acetate, as previously stated, is insoluble in water, and in alcohol, and in ketone, it is soluble in pairs of water/alcohol and water/ketone, i.e., the solvent pairs pass through the region of solubility. As a result, the water gelled membrane will dissolve either when pretreated so as to render it useless for ketone/oil separation or when just exposed to the ketone/oil feed stream.

To avoid this dissolution the membrane is first crosslinked. The crosslinked membrane is soaked in a series of solvents, preferably selected from the lower molecular weight alcohols and ketones ($C_1$-$C_6$ alcohols and $C_3$-$C_6$ ketones), most preferably the alcohols, and does not dissolve during the solvent flush operation or upon exposure to the ketone/oil feed stream. Crosslinking to prevent membrane dissolution is accomplished using any bifunctional compound which is reactive with the hydroxyl groups present in the structure of the cellulose acetate membrane. Epichlorohydrin, diisocyanates, formaldehyde, dialdehydes, diepoxides, acrylyl chlorides with a free radical initiator, diacrylates, etc. may be used. Epichlorohydrin is preferred.

Crosslinking can even be used with the cellulose acetate membranes produced from non-aqueous solvents in accordance with the present invention. This crosslinked cellulose acetate membrane produced using non-aqueous solvent can also, optionally be soaked in a series of low molecular weight alcohols and ketone prior to being employed for ketone/oil separation.

Crosslinking is performed using the crosslinking agent as an approximately 0.1 to 1M solution in a solvent (such as methanol) for 1 to 60 min. and longer, at from 0° to 80° C., longer times and higher temperatures resulting in a greater degree of crosslinking.

EXAMPLES

In all the examples, the following general procedures were employed. Cellulose 2.45-acetate and cellulose 1.8-acetate were commercial materials (Eastman CA-398-3 and CA-320S, respectively). Cellulose 1.7-acetate was synthesized from cellulose 2.45-acetate by the procedure of C. J. Malm et al., *Ind. Eng. Chem.*, 49, 79 (1957).

The polymer was dissolved in the casting solvent, and the viscous solution was filtered under pressure through a Whatman GF/F or 934AH glass microfiber filter. The solution was degassed for 2 hr. in a sealed, partially evacuated vacuum desiccator saturated with solvent vapor. Membranes were cast from this solution on a glass or Teflon plate with a Dow film applicator (0.25 mm clearance except as noted, Gardner Laboratory, Inc., Bethesda, Md.) at room temperature. The resulting films were evaporated in air at room temperature for the specified time, gelled in a solvent bath at the specified temperature for 1 hr, and annealed in a solvent bath at the specified temperature for 10 min, except as noted. The membranes floated off the casting plate during the gelation or annealing step, and the feed side (the side away from the plate) was labeled by perforating the upper right hand corner with a paper punch. Solvent exchange and crosslinking steps were employed only where noted, and membranes were stored in MEK or MIBK at room temperature.

Membrane performance was evaluated in a Millipore (Bedford, MA) #XX45-047-00 47 mm diameter stainless steel filter holder, modified with an annular stainless steel insert (41 mm i.d.×85 mm o.d.×64 mm long) between the inlet and outlet plates. The faces and bolt holes of the insert were machined to match the Millipore cell, and the cell was assembled with ethylene propylene rubber O-ring seals. A disk of Whatman #1 filter paper, wetted with MEK, was placed under the 47 mm membrane disk. The membrane was not allowed to dry and was oriented with the feed side (labeled above) towards the inlet. A Teflon washer (30 mm i.d.×41 mm o.d.×0.79 mm thick) separated the feed side of the membrane from a cylindrical magnetic stirring bar (8 mm dia.×33 mm long) driven at 240 rpm by a stroboscopically calibrated motor (Glass-Col #EMS-1, SGA Scientific Inc., Bloomfield, NJ) beneath the outlet. The feed solution (100 ml) was maintained under 2.85 MPa (414 psia) absolute nitrogen pressure and the permeate was at atmospheric pressure (room temp. about 25° C.).

The permeation was allowed to proceed for at least 90 min and until 3 ml of permeate had been collected in order to reach steady state. Permeate flow was then measured volumetrically and flux was calculated based on 7.10 cm² area (the area not covered by the Teflon washer). Selectivity is reported as rejection R of lube oil under the test conditions, defined as $$R = 1 - \frac{\text{(weight fraction of lube in permeate)}}{\text{(weight fraction of lube in feed)}}$$

Rejection was determined either by weighing the lube oil residue after evaporation of an aliquot of permeate at about 1 Torr and room temperature or, in the case of binary feeds, by comparison of refractive index with a calibration curve. The validity of each method was established with known standards; the precision was ±0.3% lube rejection for the former method and ±2% for the latter.

Feed compositions are specified as percent by weight, and the lube oil was a 600N dewaxed grade except as noted.

Example 1

This example demonstrates that conventional uncrosslinked cellulose 2.45-acetate is unsuitable for membranes required to withstand ketone dewaxing solvents such as MEK.

A 0.20 g sample of cellulose 2.45-acetate was added to 3.1 g MEK. The polymer dissolved completely in less than 1 hr. at 25° C.

Example 2

This example demonstrates that a conventional cellulose 2.45-acetate membrane does not withstand ketone solvents even after crosslinking.

A membrane was cast from a solution of cellulose 2.45-acetate (25 g), acetone (45 g), and formamide (30 g). After evaporation for 15 sec, the membrane was gelled in water at 0° C. and annealed in water for 1 hr. at 85° C. It was then crosslinked by immersion in a solution of 0.5M epichlorohydrin and 0.5M triethyl amine in methanol at room temperature for 18 hr. An 0.43 g sample of the membrane wetted with methanol was immersed in 100 ml acetone at room temperature for several hours. Evaporation of the acetone phase yielded 0.036 g of dry cellulose acetate, showing that the membrane still had substantial solubility in acetone.

Example 3

This example demonstrates that an uncrosslinked cellulose 1.7-acetate membrane, fabricated from a conventional solvent system, is unsuitable for ketone/oil separation.

Membranes were cast from a solution of cellulose 1.7-acetate (25 g), acetone (45 g), and formamide (30 g). After evaporation for 15 sec, the membranes were gelled in water at 0° C. and annealed in water for 1 hr at 72° C. They were then subjected to a solvent exchange process, comprising successive immersion in methanol, ethanol, acetone, and MEK. Upon immersion in acetone or MEK, the membranes usually swelled and softened to such an extent that they disintegrated into many pieces. If acetone was omitted from the solvent exchange sequence, then the membranes usually developed wrinkles during the exchange process but did not disintegrate. All of the membranes surviving either exchange sequence were freely permeable even to unpressurized MEK and were unselective (0% rejection) for separation of lube oil from ketone.

Example 4

This example demonstrates that a cellulose 1.7-acetate membrane, fabricated from a conventional solvent system, can be made suitable for ketone/oil separation by crosslinking.

Membranes were cast from a solution of cellulose 1.7-acetate (25 g), acetone (45 g), and formamide (30 g). After evaporation, the membranes were gelled in water at 0° C. and were annealed in water; evaporation times and annealing times and temperatures are indicated in Table 1. The membranes were then mixed with water, immersed in methanol for at least 30 min, and crosslinked by immersion in a freshly prepared methanol solution containing the indicated concentrations of epichlorohydrin and triethyl amine for the indicated time at room temperature. The membranes were then successively immersed in exchange solvents methanol (two portions), ethanol, acetone, and MEK for 15 min each.

Membranes 1 and 2, which are crosslinked for a shorter time or with lower epichlorohydrin and triethyl amine concentrations and 3–10, disintegrated during the solvent exchange process. Membranes 3–10 were more extensively crosslinked and did not disintegrate. These membranes were selective for separation of ketone dewaxing solvent for dewaxed lube oil, as shown in Table 1. For comparison, regenerated cellulose membranes (Enka PM250, 17.5 μm thick, molecular weight cutoff (MWCO) about 10,000–12,000) were pretreated by soaking (without pressure) in a sequence of solvents (water (3 times), methanol, ethanol, acetone, and MEK) prior to being put on feed. At no time were the membranes permitted to dry out.

Example 5

This example demonstrates that an uncrosslinked cellulose 1.8-acetate membrane can be made suitable for the ketone/oil separation by fabrication from a sequence of solvents with proper solubility relationships according to this invention.

Membranes were cast from cellulose 1.8-acetate solutions in methanol/cyclohexane and methanol/propylene carbonate and gelled in various solvents as indicated in Table 2. Evaporation times were 15 sec and membranes were not annealed. Membranes were contacted directly with MIBK after gelation, without intermediate solvent exchange steps, and performance was evaluated with a feed containing 20% lube, 24% MEK, and 56% MIBK. Results are given in Table 2.

The solvent sequences employed in fabricating membranes 11 and 13–17 were selected according to the solubility parameter rules described above and illustrated in FIG. 1, FIG. 2 and FIG. 3. The solvents employed in fabricating membrane 12 departed slightly from the preferable version of these rules, in that the line connecting the solubility parameters of solvent B (cyclohexanone) and solvent C (ethanol) intersects the solubility region of cellulose 1.8-acetate, as does the line between solvent C and feed. A possible reason why this solvent system is nonetheless acceptable has been discussed above.

Example 6

This example further illustrates the use of properly selected solvents to fabricate uncrosslinked cellulose 1.8-acetate membranes and shows the effect of other fabrication variables on membrane performance.

Membranes were cast from a solution of 20.4 g of cellulose 1.8-acetate in 30.6 g of methanol and 49.0 g of cyclohexanone, gelled in MIBK, and annealed in MIBK. Evaporation times, gelation temperatures, and annealing temperatures are listed in Table 3. The membranes were contacted directly with feed and performance was evaluated (Table 3).

The solvent sequence employed in fabricating these membranes was the same as that of FIG. 1, FIG. 2 and FIG. 3, discussed above, and of membrane 11 in example 5. It is seen that combinations of evaporation time, gelation temperature, and annealing temperature that decreased flux generally had a beneficial effect on selectivity.

TABLE 1

PERFORMANCE OF CROSSLINKED CELLULOSE 1.7-ACETATE MEMBRANES

| Membrane | Thickness[a] (mm) | Evaporation time (sec) | Annealing temp.(°C.) | Annealing time (min) | Crosslinker conc.[b] (M) | Crosslinking time (hr) | Feed[c] (lube/MEK MIBK/water) | Flux (10$^{-5}$ ml/cm$^2$-sec) | Lube Rejection | Separation factor[g] |
|---|---|---|---|---|---|---|---|---|---|---|
| 1 | 0.25 | 15 | 72 | 10 | 0.5 | 0.17 | | Membrane disintegrated | | |
| 2 | 0.25 | 15 | 72 | 10 | 0.25 | 0.5 | | Membrane disintegrated | | |
| 3 | 0.25 | 15 | 72 | 10 | 0.5 | 0.5 | 0/100/0/0 | 8.7 | | |
| | | | | | | | 1/99/0/0[d] | 6.2 | 98.5 | 67 |
| | | | | | | | 20/80/0/0 | 6.0 | 99.7 | 410 |
| 4 | 0.25 | 15 | 72 | 60 | 0.5 | 18.0 | 0/100/0/0 | 2.9 | | |
| | | | | | | | 1/99/0/0[d] | 2.9 | 83.4 | 6.1 |
| | | | | | | | 20/80/0/0 | 2.6 | 96.8 | 39 |
| | | | | | | | 20/24/56/0 | <0.05 | | |
| 5 | 0.25 | 15 | 62 | 10 | 0.5 | 0.5 | 0/100/0/0 | 16.8 | | |
| | | | | | | | 20/80/0/0 | 11.8 | 99.8 | 620 |
| 6 | 0.25 | 15 | 52 | 10 | 0.5 | 0.5 | 0/100/0/0 | 19.7 | | |
| | | | | | | | 20/80/0/0 | 12.4 | 99.8 | 620 |
| | | | | | | | 20/24/56/0 | 5.8 | 98.6 | 88 |
| 7 | 0.18 | 0 | 52 | 10 | 0.5 | 0.5 | 20/80/0/0 | 29.2 | 95 | 25 |
| 8 | 0.18 | 15 | 52 | 10 | 0.5 | 0.5 | 20/80/0/0 | 9.4 | <98 | <62 |
| | | | | | | | 20/24/56/0 | 21 | 99.3 | 180 |
| | | | | | | | 20/23.5/55.5/1 | 11 | 99.7 | 420 |
| 9 | 0.18 | 60 | 52 | 10 | 0.5 | 0.5 | 20/80/0/0 | 6.1 | <98 | <62 |
| 10 | 0.18–0.25 | 8–15 | 52 | 10 | 0.5 | 0.5 | 20/80/0/0 | 21$^e$ + 7$^f$ | <98 | <62 |
| Regenerated Cellulose Enka PM 250 | | | | | | | 20/80/0/0 | 49$^h$ ± 15$^f$ | 92$^h$ ± 1$^f$ | 15 |
| Regenerated Cellulose Enka PM 250 | | | | | | | 20/24/56/0 | 60 | 68$^i$ ± 5$^f$ | 3.7 |
| Regenerated Cellulose Enka PM 250 | | | | | | | 20/23.5/55.5/1 | 16 | 84 | 7.6 |

[a]Clearance of casting knife
[b]Concentration of both epichlorohydrin and triethyl amine in methanol.
[c]Lube was 600N dewaxed oil except as noted. Concentrations are % by weight.
[d]Lube was 150N dewaxed oil.
[e]Average of 8 membranes, including 6 and 8 above, prepared by three persons within the indicated narrow range of conditions from two batches of polymer derived from different lots of Eastman CA-398-3.
[f]Standard deviation of the individual observations, not error limit of the average.
[g]Separation factor ($\alpha$) defined by
$$\alpha = \frac{[\text{ketone}]\text{ permeate}/[\text{ketone}]\text{ feed}}{[\text{lube}]\text{ permeate}/[\text{lube}]\text{ feed}} = \frac{(\text{ketone flux})/[\text{ketone}]\text{ feed}}{(\text{lube flux})/[\text{lube}]\text{ feed}}$$
[h]Average of 4 membranes
[i]Average of 3 membranes

TABLE 2

PERFORMANCE OF UNCROSSLINKED CELLULOSE 1.8-ACETATE MEMBRANES

| Membrane[b] | Casting Solution (wt. %) | Gelation Solvent | Gelation Temp. (°C.) | Flux (10$^{-5}$ml/cm$^2$-sec) | Lube Rejection (%) |
|---|---|---|---|---|---|
| 11 | 21.0 polymer[a] | MIBK | 0 | 100 | 26[b] |
| 12 | 31.8 methanol | Ethanol | 24 | 58 | 87 |
| 13 | 47.2 cyclohexanone | Tetralin | 0 | 4 | 95 |
| 14 | | Chlorobenzene | 24 | 61 | 67 |
| 15 | | Toluene | 24 | 26 | 84 |
| 16 | 24.9 polymer | MIBK | 0 | 14 | 95 |
| 17 | 37.5 methanol | Tetralin | 0 | 0.6 | 95 |
| | 37.6 propylene carbonate | | | | |

[a]Polymer was Eastman cellulose 1.8-acetate CA-320S.
[b]Membranes were not annealed.

TABLE 3

EFFECT OF FABRICATION VARIABLES ON UNCROSSLINKED MEMBRANE PERFORMANCE

| | | | | Feed (lube/MEK/MIBK/H$_2$O) | | | |
|---|---|---|---|---|---|---|---|
| | | | | 20/24/56/0 | | 20/23.5/55.5/1.0 | |
| Membrane | Evaporation time (sec) | Gelation temp. (°C.) | Annealing temp. (°C.) | Flux (10$^{-5}$ ml/cm$^2$-sec) | Rejection (%) | Flux (10$^{-5}$ ml/cm$^2$-sec) | Rejection (%) |
| 18 | 30 | 24 | 70 | 90 | 76 | 33 | 82 |
| 19 | 15 | 0 | 47 | 107 | 52 | 40 | 56 |
| 20 | 15 | 0 | 70 | 95 | 69 | 48 | 80 |
| 21 | 15 | 24 | 47 | 112 | 62 | 74 | 77 |
| 22 | 15 | 24 | 70 | 90 | 63 | 69 | 82 |
| 23 | 45 | 0 | 47 | 58 | 86 | 29 | 88 |
| 24 | 45 | 0 | 70 | 57 | 71 | 15 | 84 |
| 25 | 45 | 24 | 47 | 50 | 84 | 21 | 92 |
| 26 | 45 | 24 | 70 | 38 | 87 | 17 | 94 |

What is claimed is:

1. A process for separating dewaxing solvent from dewaxed oil comprising the steps of contacting the dewaxed oil-dewaxing solvent combination under pressure with a cellulose acetate membrane wherein the cellulose acetate membrane is a cellulose 1.7-1.8 acetate membrane prepared by the steps of:

(a) dissolving 5 to 40 weight percent cellulose 1.7-1.8 acetate polymer in a dual casting solvent system comprising 15 to 50 weight percent solvent A and 20 to 80 weight percent solvent B wherein solvent B is a nonsolvent for the polymer while solvent A is either a solvent or nonsolvent for the polymer, but the mixture A plus B is a solvent for the polymer;

(b) casting a film using the solution of step (a);

(c) evaporating a portion of the more volatile solvent A from the film; and (d) gelling the partially evaporated film in a gelation solvent C which does not dissolve the polymer but is miscible with solvents A and B and further wherein the solvent combination of B+C is a nonsolvent for the polymer, wherein solvent A possesses three dimensional solubility parameters in the range of $\delta_D 32\ 7$ to 10, $\delta_P = 1$ to 10 and $\delta_H = 6$ to 12 and solvents B and C possess three dimensional solubility parameters in the range of $\delta_D = 7$ to 10, $\delta_P = 0$ to 10 and $\delta_H = <2.5$, wherein all $\delta$'s are in $(cal/cm^3)^{\frac{1}{2}}$.

2. The process of claim 1 wherein the cellulose acetate membrane is further soaked in a series of solvents wherein the first solvent is miscible with the gelation bath solvent, each solvent in series being miscible with preceding solvent and with the next succeeding solvent, the last solvent being miscible with the feed, each solvent being a nonsolvent for the membrane and wherein each successive pair of solvents in the series is a nonsolvent for the membrane.

3. The process of claim 1 further comprising the membrane fabrication steps of:

(e) annealing the membrane of step (d) in a solvent (D) which is the same as, or is miscible with solvent C which does not dissolve the polymer and wherein the solvent pair D+C (if D is different from C) is not a solvent for the polymer and wherein solvent D possesses three dimensional solubility parameters in the range of $\delta_D = 7$ to 10, $\delta_P = 0$ to 10 and $\delta_H < 2.5$ wherein all $\delta$'s are in $(cal/cm^3)^{\frac{1}{2}}$.

4. The process of claim 3 wherein the cellulose acetate membrane produced in the annealing step is further soaked in a series of solvents wherein the first solvent is miscible with the annealing solvent, each solvent in series being miscible with the preceding solvent and with the next succeeding solvent, the last solvent being miscible with the feed, each solvent being a nonsolvent for the membrane, and wherein each pair of solvents in the series is a nonsolvent for the membrane.

5. The process of claim 1 wherein the dewaxing solvent is selected from $C_3$ to $C_6$ ketones and mixtures thereof, or mixtures of $C_3$ to $C_6$ ketones with $C_6$ to $C_{10}$ aromatic hydrocarbons.

* * * * *